(12) United States Patent
Borg

(10) Patent No.: US 6,313,872 B1
(45) Date of Patent: Nov. 6, 2001

(54) SECURITY SYSTEM FOR HOMES AND SMALL OFFICES

(75) Inventor: Arthur N. Borg, Jen Wu Village (TW)

(73) Assignee: Isabelle R. Borg, Martinsville, IN (US)

( * ) Notice: Subject to any disclaimer, the term of this patent is extended or adjusted under 35 U.S.C. 154(b) by 0 days.

(21) Appl. No.: 08/080,471

(22) Filed: Jun. 18, 1993

(51) Int. Cl.[7] ................................................. H04N 7/18
(52) U.S. Cl. ................................................................. 348/155
(58) Field of Search ................................. 348/152, 154, 348/155, 156, 469, 151, 14, 153, 143, 584, 588, 589, 466; 340/541, 825.32, 825.3, 825.36; 382/159

(56) References Cited

U.S. PATENT DOCUMENTS

| | | | | |
|---|---|---|---|---|
| 3,816,654 | | 6/1974 | Brightman | 178/7.2 |
| 3,924,130 | * | 12/1975 | Cohen et al. | 348/152 |
| 4,025,950 | * | 5/1977 | Matsumoto et al. | 348/420 |
| 4,075,659 | | 2/1978 | Desanti | 358/108 |
| 4,361,730 | * | 11/1982 | Barber et al. | 348/14 |
| 4,370,675 | | 1/1983 | Cohn | 358/108 |
| 4,408,224 | * | 10/1983 | Yoshida | 348/155 |
| 4,510,526 | * | 4/1985 | Coutta et al. | 348/143 |
| 4,524,384 | | 6/1985 | Lefkowitz et al. | 358/108 |
| 4,566,123 | * | 1/1986 | Yoshida | 382/159 |
| 4,568,981 | * | 2/1986 | Beaulier | 348/589 |
| 4,581,634 | * | 4/1986 | Williams | 348/156 |
| 4,651,143 | | 3/1987 | Yamanaka | 340/691 |
| 4,750,011 | | 6/1988 | Kajiura et al. | 354/76 |
| 4,772,945 | | 9/1988 | Tagawa et al. | 358/108 |
| 4,774,570 | * | 9/1988 | Araki | 348/154 |
| 4,807,033 | * | 2/1989 | Keesen et al. | 348/466 |
| 4,821,118 | * | 4/1989 | Lafreniere | 348/156 |
| 4,857,912 | * | 8/1989 | Everett, Jr. et al. | 340/825.32 |
| 4,882,732 | * | 11/1989 | Kaminaga | 371/212 |
| 4,959,713 | | 9/1990 | Morotomi et al. | 358/108 |
| 5,142,604 | * | 8/1992 | Lee | 348/156 |
| 5,151,693 | * | 9/1992 | Onoe et al. | 340/825.3 |
| 5,155,474 | * | 10/1992 | Park et al. | 340/541 |
| 5,164,980 | | 11/1992 | Bush et al. | 379/53 |
| 5,187,574 | | 2/1993 | Kosemura et al. | 358/108 |
| 5,283,644 | * | 2/1994 | Maeno | 348/152 |
| 5,309,450 | * | 5/1994 | Kim | 348/469 |
| 5,382,943 | * | 1/1995 | Tanaka | 348/143 |

OTHER PUBLICATIONS

*The Radio Amateur's Handbook* by the Headquarters Staff of the American Radio Relay League, Douglas Blakeslee, et al, 1972 p635.*

Spragins et al, *Telecommunications Protocols and design*, Addison–Wesley Publishing Company, 1991, pp. 226–229.*

* cited by examiner

Primary Examiner—Howard Britton
(74) Attorney, Agent, or Firm—Robert E. Malm

(57) ABSTRACT

The security system for homes and small offices provides snapshots of potential trespassers for viewing on conventional television receivers. The system consists of at least one scene capture unit, a scene recovery unit, and communication links between the scene capture units and the scene recovery unit. A scene capture unit consists of a motion detector, a conventional television camera, and circuitry which converts the camera signal into a sequence of integers that is stored in semiconductor memory and then communicated to the scene recovery unit. The scene recovery unit generates from the sequence of integers communicated by the scene capture unit a signal which, when fed into a conventional television receiver, causes the scene recorded by the camera to be displayed on one portion of the television screen and the time of occurrence to be displayed on another portion. In those situations where building access by authorized persons is significant, the scene capture unit is equipped with an event detector which aborts the processing of snapshots taken of authorized persons either entering or leaving the building.

37 Claims, 2 Drawing Sheets

SECURITY SYSTEM FOR HOMES AND SMALL OFFICES

BACKGROUND OF INVENTION

This invention relates generally to security systems that provide visual records of trespassers that approach entryways to buildings. More specifically, the invention relates to simple low-cost security systems that are suitable for protecting homes and small offices.

Security systems presently exist which detect persons, animals, and other objects approaching entryways to buildings and then turn on a television camera as a means of obtaining an electronic record of the event. The television camera signal is either transmitted over a video-bandwidth communication link to a building occupant or recorded on magnetic tape at the camera location. In the latter case, an alerting signal is transmitted over an audio-bandwidth communication link to the building occupant who investigates the occurrence by visiting the camera site and playing back the tape.

The cost and complexity of such systems generally make them unsuitable for use in homes and small offices. In addition, the lack of a screening mechanism that would cause the security system to ignore entries into the building by authorized persons is a serious defect in buildings where a large amount of such traffic is to be expected.

BRIEF SUMMARY OF INVENTION

The present invention is a security system consisting of a scene capture unit and a scene recovery unit linked by a narrow-band communication link. The scene capture unit utilizes a motion sensor to detect someone approaching an entryway to a building, a conventional television camera to generate a snapshot of the visitor, and circuitry to convert the camera output into a sequence of integers that can be stored in semiconductor memory. The scene recovery unit generates from the sequence of integers communicated by the scene capture unit over the communication link a video signal which, when fed into a conventional television receiver, creates a display of the camera-observed scene in one portion of the television screen and a display of the time of occurrence in another portion.

In those situations where controlled access to the building is permitted to certain persons, the scene capture unit is equipped with an "event" detector that signals when an occupant or authorized visitor enters or leaves the building and aborts the processing of the snapshot obtained when the person entering or leaving triggers the motion sensor.

A two-way communication link is provided in those situations where control over the scene capture unit by the user at the scene recovery unit location must be exercised or where the corruption of the received data during the communication process requires the transmission of a request for a retransmission.

To enable the scene capture unit to operate for long periods of time on battery power, the unit is equipped with power-conserving means which turns on power to the camera and the processing and communication circuits only when they are being used.

DESCRIPTION OF THE PREFERRED EMBODIMENT

The security system for homes and small offices consists of a scene capture unit, a scene recovery unit, an a communication link between the two, a scene being a visual perception of objects contained in a specified solid angle.

The purpose of the scene capture unit is to detect an intruder approaching the point of entry to a home or office and to communicate this scene to the scene recovery unit. The scene information received from the scene capture unit is processed by the scene recovery unit and then stored in memory together with previously captured scenes, the four most recently captured scenes always being retained in memory. The scene data together with the time of receipt at the scene recovery unit can also be recorded on an audio tape recorder.

The stored scenes are read out repetitively from memory to an output video port and may be viewed by connecting a television receiver to the video port. Each scene typically appears for a few seconds unless the viewer specifies a different interval or selects one scene for continual display.

More than four scenes may be stored in the scene recovery unit simply by adding more memory.

Figure 1:
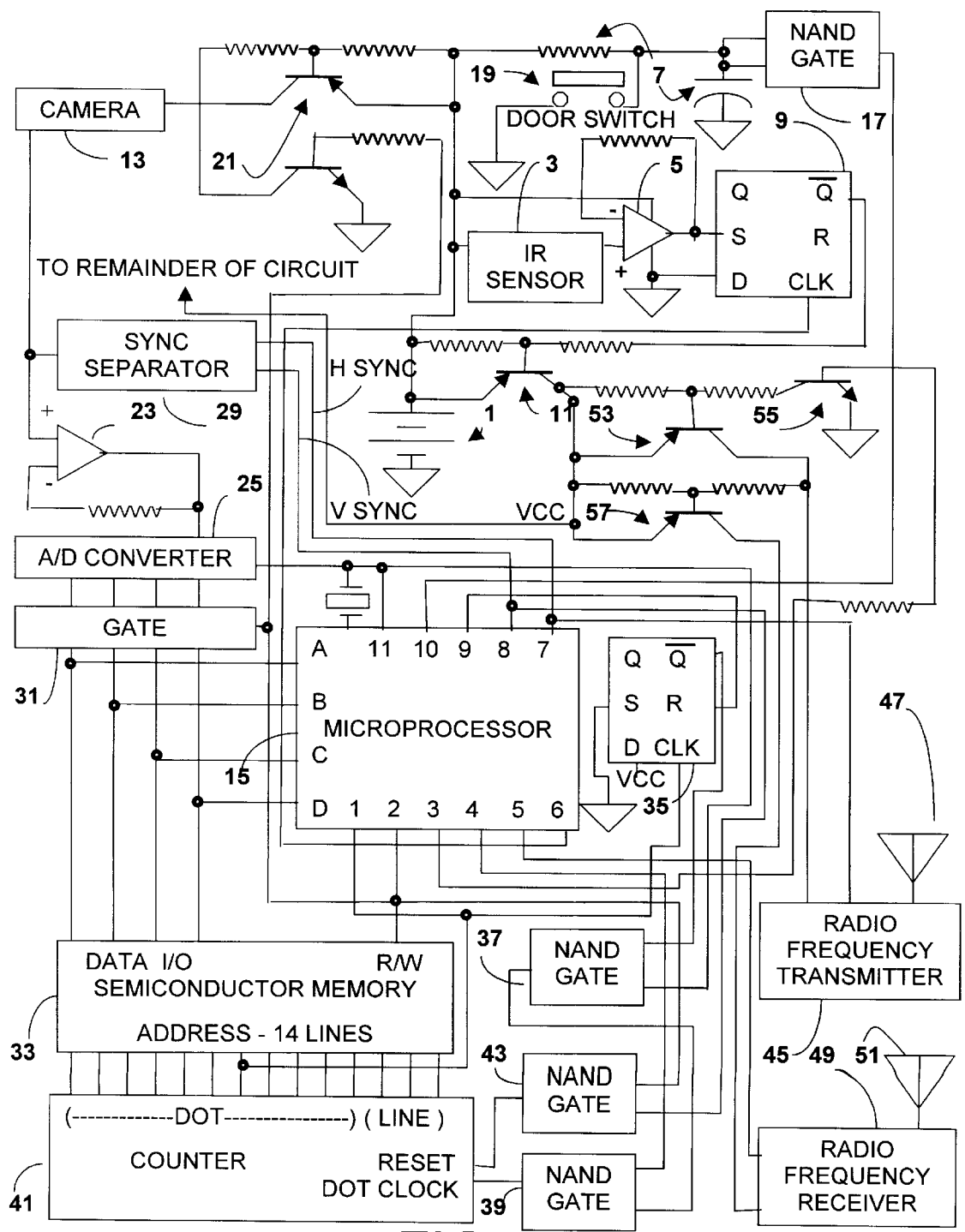
FIG. 1 is a block diagram of the scene capture unit and its associated communication equipment.

The preferred embodiment of the scene capture unit is shown in FIG. 1. The only components powered initially by the battery 1 is the infrared sensor 3 which functions as a motion detector, its associated amplifier 5, and the resistor-capacitor combination 7 which are mounted at the point of entry in a concealed location. An intruder entering the field of view of the infrared sensor would be detected by the sensor because of the difference between the intruder's temperature and the temperature of the background that was being viewed prior to the arrival of the intruder.

The preferred motion detector is an infrared sensor. For other applications of the invention other types of motion detectors may be preferable such as those based on reflections of electromagnetic waves, light waves, and ultrasonic pressure, those based on the disturbance of static electric or magnetic fields, and those based on any other phenomenon whereby the motion of something within a scene can be detected.

The detection of a change in temperature in some region of the infrared sensor's field of view results in an amplifier output pulse which sets the D-type flip-flop 9 thereby causing the transistor switch 11 to close and deliver battery power to all of the other components except the camera 13. Circuitry is provided within the infrared sensor 3 that limits detections to minimum intervals of about 15 seconds so that in general, only one picture of a particular intruder is obtained as he approaches the entryway.

The camera 13, a conventional television camera, is mounted at the point of entry in a concealed location adjacent to the location of the infrared sensor 3 and amplifier 5. The field of view of the infrared sensor should preferably be approximately the same as the field of view of the camera.

The microprocessor 15 performs an initialization process when it receives power and then determines the state of inverter 17 (shown as a NAND gate with inputs connected together) at microprocessor terminal (MT) 10 for the purpose of determining whether a building occupant has left the home or office through the entryway door just prior to the generation of the intruder detection signal by the infrared sensor 3.

A normally-open entryway door switch 19 closes whenever the entryway door opens thereby discharging the capacitor of the resistor-capacitor combination 7 and causing the output of the inverter 17 to go high. When the door closes the capacitor recharges with an RC time constant of such a magnitude that the inverter switches from high to low approximately 15 seconds after the door closes.

Other events besides an opening door may be used to discriminate between potential trespassers and building occupants. The operation of a key in the door, the insertion of a badge into a slot, the pushing of the button that activates the door bell, the speaking into a microphone which activates a voice recognition circuit, and the pressing of a thumb against a glass panel which activates a thumbprint recognition device are a few examples of events that might substitute for an opening door.

If the microprocessor 15 finds after being powered up that the state of inverter 17 is high, it concludes that a guest, invitee, member of the family, or business employee left the home or office and subsequently triggered an output from the infrared sensor 3. It aborts the process of capturing an image of the intruder by pulsing MT 6 thereby clocking D flip-flop 9 and causing Q-bar to go high. When Q-bar goes high, power supplied by transistor 11 to the processing circuitry is turned off and the scene capture unit reverts to waiting for the next intrusion.

If the microprocessor 15 finds after being powered up that the state of the inverter 17 is low, the scene capture process continues. The microprocessor causes the signal appearing at MT 2 to go high thereby applying power to camera 13 through transistor 21.

The output video signal from the camera is amplified by the video amplifier 23 and filtered to reduce the bandwidth to approximately 1.5 MHz. The amplified band-limited video signal is sampled by the analog-to-digital (A/D) converter 25 using the 3.28-MHz clock signal of the microprocessor 15 obtained at MT 11. The sampled picture elements (pixels) are converted by the A/D converter to 4-bit binary representations.

The sync separator circuit 29 extracts the horizonal and vertical sync signals from the camera video output signal and supplies them to the microprocessor 15.

The read/write (R/W) signal appearing at MT 2 enables the gate array 31 thereby allowing the 4-bit pixel amplitudes from A/D converter 25 to feed into the semiconductor memory 33 and places the memory in the write mode.

The microprocessor 15 waits until the end of the vertical blanking pulse which represents the start of a field transmission from the camera 13. It then waits for the end of the horizontal blanking pulse which represents the start of the transmission of the first line of a field. The microprocessor delays approximately 6.5 microseconds (equivalent to about 21 pixels) at the end of every other horizontal blanking pulse and then causes MT 9 to go high thereby resetting the D-type flip-flop 35 and causing the Q-bar output to go high. The signal at MT 4 is kept high while the semiconductor memory 33 is in the write mode and as a result the microprocessor clock signal passes through NAND gates 37 and 39 and begins clocking the 14-bit counter 41.

The 14 bits of counter 41 connect to the address lines of semiconductor memory 33. As the counter counts from 0 to 127, pixel amplitudes from the central portion of the first line of the picture are stored in individual 4-bit memory cells by strobing the memory 33 with the least significant bit from the counter.

Counting from the least significant bit (the bit that changes with each low-to-high transition of the clock signal), the transition of the seventh bit from high to low signals that 128 pixels from the first line have been stored in memory.

The seventh bit connects to the clock input of flip-flop 35. When the seventh bit's transition from high to low occurs, Q-bar of flip-flop 35 goes low thereby blocking the clock signal from MT 11 from entering the counter 41. The process of storing the pixel amplitudes for the central portion of a line begins again with the end of every other horizontal blanking pulse until 128 lines of the 262.5 lines in a field are stored in memory at which point the write process to the memory ends. The read process begins at the end of the next vertical blanking pulse.

The process described above stores the central 128 pixels of each line's approximate 170 pixels—about ¾ of the original line—and every other line of a field. Since each line in a field is ⅓ the vertical dimension of the field, the scene capture process is equivalent to placing a square mask over the central region of a field, the vertical dimension of the mask being the same as that of the field.

The next vertical blanking pulse resets the counter 41 by means of NAND gate 43 and causes the read/write signal to go low at the end of the pulse thereby switching the memory 33 to the read mode.

In the read mode the signal on microprocessor terminal 9 is held low thereby preventing the resetting of flip-flop 35 and preventing the microprocessor clock signal from clocking the counter 41. The power to the camera 13 is also turned off as a result of the bias on the base of transistor 21.

The field data contained in the memory 33 at the end of a write cycle is transmitted to the scene recovery unit by means of a bidirectional communication link. The portion of the communication link residing in the scene capture unit is the transmitter 45, the transmitting antenna 47, the receiver 49, and the receiving antenna 51.

Before starting a transmission the microprocessor 15 waits approximately 15 seconds and then checks the state of inverter 17 once again at MT 10. If the signal is high, the microprocessor concludes that someone with permission to enter the home or office triggered the infrared sensor and then opened the door. Under these circumstances, the microprocessor resets the D flip-flop 9 by pulsing MT 6 thereby causing transistor 11 to turn off the power to the processing circuits in the scene capture unit.

If the signal on MT 10 is low, transmission of data begins if the communication channel is not in use. If the channel is being used by either the scene recovery unit or another scene capture unit, the scene capture unit that is the subject of this discussion waits until the channel is free before beginning a transmission.

The microprocessor 13 monitors MT 5, the port which receives data from the receiver 49. The microprocessor waits until the transmission of data is not occurring and then begins transmission by placing a signal on MT 3 which causes the series-connected resistor pair that supplies a bias voltage to transistor 53 to be connected to ground through transistor 55 thereby letting power pass through transistor 53 to the transmitter 45. At the same time transistor 57 is biased to cut off power to the receiver 49.

After the power to the transmitter 45 is turned on the microprocessor 15 sends to the transmitter on the line connected to MT 7 a serial bit stream consisting of a preamble, a scene capture unit identification code, the scene data, and a check sum. The preamble is utilized by the scene recovery unit in determining bit timing and the start of the scene data. A suitable preamble is an alternating sequence of 30 "one's" and "zero's" followed by two "one's". The preamble is stored in a register in the microprocessor and read out serially at a 5-kHz rate.

The scene capture unit identification code is a 4-bit code which identifies the transmission as being from one of 16 scene capture units. It is stored in a register and transmitted immediately following the preamble.

The microprocessor 15 then places a 1.25-kHz clock signal on MT 4 thereby causing the counter 41 to count from 0 to 16,383 at which point the clock signal is suppressed. For each count the 4-bit content of the memory cell addressed by the counter is read by the microprocessor and then transmitted serially at a rate of 5 kbps to the transmitter 45.

After transmitting the scene data the microprocessor 45 transmits a check sum which provides a means for determining whether the transmitted data was received correctly by the scene recovery unit. The microprocessor obtains a check sum by accumulating in a register all of the 4-bit words retrieved from memory during the transmission.

An alternative to computing a check sum is to encode the scene data using an error detecting code. This approach would permit the scene recovery unit to assess the degree to which the received data was corrupted during the transmission.

The 5-kbps serial bit stream from the microprocessor 15 is Manchester coded in the transmitter 45 by replacing each "zero" by a half-bit-wide pulse in the second half of the bit period and each "one" by a half-bit-wide pulse in the first half of the bit period. In this way a modulation transition midway through each original bit period is guaranteed thereby easing the determination of bit timing in the scene recovery unit.

The Manchester-coded bit stream frequency modulates a 49.7 MHz carrier with a 5-kHz deviation. The modulated signal is radiated by the antenna 47 at a power level of 10 dbm.

An RF communication link is the preferred embodiment for the most difficult communication situations. If the situation permits, an infrared communication link or carrier current communications using the house wiring might be substituted.

The time required to transmit the message of approximately 64000 bits at a rate of 5 kbps is about 13 seconds. The microprocessor 15 waits for a response from the scene recovery unit which may be a request for a retransmission. If the response is a request for a retransmission, the microprocessor retransmits.

If no response is received from the scene recovery unit within five seconds after a transmission has been completed, the microprocessor shuts down by resetting D flip-flop 9.

Figure 2:
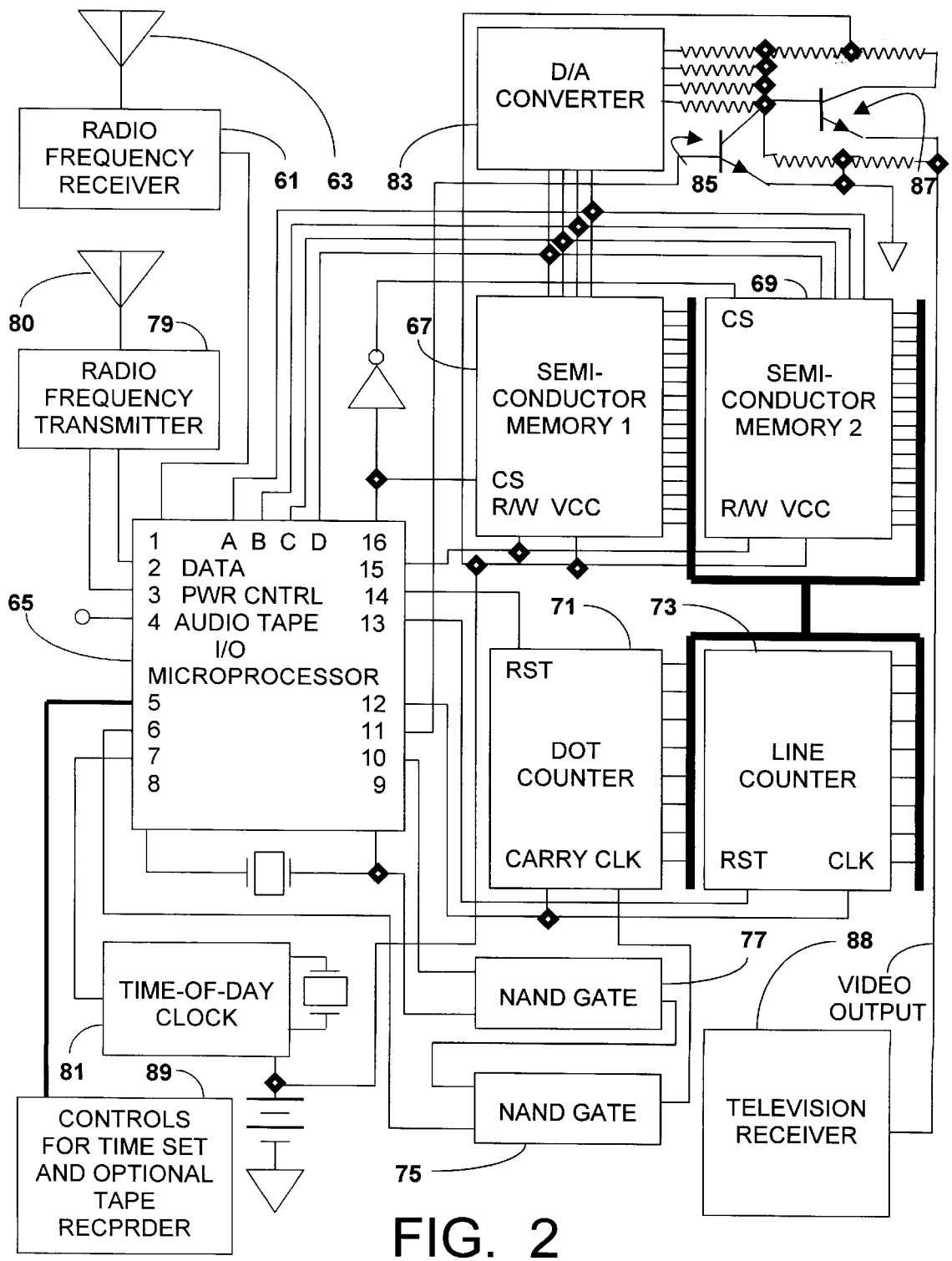
FIG. 2 is a block diagram of the scene recovery unit and its associated communication equipment.

The scene recovery unit is shown in FIG. 2. The receiver 61 monitors the communication channel by means of the antenna 63 and when a signal arrives, it establishes bit timing utilizing the preamble, demodulates the arriving signal, and feeds the resulting serial bit stream into the microprocessor 65 at microprocessor terminal (MT) 1. The serial bit stream augmented at the end by digital codes that specify the date and time of arrival and the identity of the scene capture unit that communicated the data is made available at MT 4 where it can be recorded using an audio tape recorder.

When the microprocessor recognizes the two successive "ones" that follow alternating "ones" and "zeros", it stores the next four bits in the scene capture unit identity register. The bits that follow the identity code are grouped in fours for transmission to semiconductor memories 67 and 69 where they are stored at locations specified by the eight-bit dot address supplied by the dot counter 71 and by the eight-bit line address supplied by the line counter 73.

Each of the memories 67 and 69 stores two scenes, each scene being augmented by a scene capture unit identity code and date and time information pertaining to when the scene was captured by the scene capture unit. Each scene, when displayed on a television screen, will occupy the first 128 dots of the 171 available on each line and every other of the top 256 lines of the 262.5 which span the vertical dimension of the screen. The associated visual display of the scene capture unit identity code and the date and time of arrival will occupy the 43 remaining dots of each line and the same lines as the scene data. The two pictures stored in a memory will occupy the dot address range of 0 to 171. One of the scenes will occupy the line address range of 0 to 127 while the other will occupy the line address range of 128 to 255. Thus, each memory requires a 16-bit address space.

The process of storing the arriving four-bit groups, which represent the pixel amplitudes of the scene captured by the scene capture unit, begins with the microprocessor 65 placing the first-arriving 4-bit pixel amplitude on MTs A, B, C, and D. The microprocessor resets the dot counter 71 to 0 and the line counter 73 to either 0 or 128, depending on which address space contains the oldest scene data, by means of signals on MT 13 and MT 14. The microprocessor causes MT 15 to go high thereby placing the memories 67 and 69 in the write mode. By means of a signal at MT 16 the microprocessor strobes the memory containing the oldest scene data thereby storing the four bits at MTs A, B, C, and D in the location corresponding to the first dot of the first line of the oldest scene data stored in either memory.

The arrival of the next four-bit pixel amplitude at MTs A, B, C, and D causes a clock pulse to appear on MT 6 and to travel through NAND gate 75 and clock the dot counter, the other input to the NAND gate being high as a result of the signal on MT 10 being maintained low while the memories are in the write mode. The storing of the second pixel amplitude is accomplished when the microprocessor 65 again strobes the memory.

The remaining 126 amplitudes of the first-line pixels are stored as the dot counter 71 counts up to 127. The dot counter is reset to zero with the 128th count and generates a carry which advances the line counter 73 to a count of one.

The process of storing the pixel amplitudes associated with the second line of the scene now proceeds in the same way as those associated with the first.

Line by line the pixel data is stored in the selected memory until 128 lines have been stored. The process of storing the received data in memory ends and the microprocessor 65 determines whether the received data was received without error. The check sum, which is the concluding piece of data transmitted by the scene capture unit, is compared with the accumulated sum of the pixel amplitudes that the microprocessor computed as it was writing the pixel data into memory. If the received check sum is not the same as the computed check sum, the microprocessor turns on the power to the transmitter 79 by means of a signal at MT 3 and transmits a retransmission request on MT 2 via the antenna 80 to the scene capture unit. When the new scene data arrives, it is written over the incorrect data that has been stored in memory.

If the microprocessor 65 is unable to obtain correct data after three transmissions, it sets an alarm which notifies the user of a possible equipment malfunction and proceeds to the next processing stage described below even though some of the received data may be incorrect.

An alternative error control approach is to encode the scene data at the scene capture unit using an error correcting code. With this approach errors in transmission could be corrected without the necessity of retransmitting the data. If this approach were employed, the communication link from scene recovery unit to scene capture unit could be omitted if there were no requirement for the user at the scene recovery unit location to exercise control over the scene capture unit.

If the received check sum is the same as the computed check sum, the microprocessor 65 proceeds to the next processing stage where the scene data is augmented with data which will translate into a visual display of the scene capture unit identity code and date and time information. The microprocessor converts the augmented data into a video signal that can be fed into a conventional television and displayed or recorded by means of a video cassette recorder.

The scene data is shown on the left side of the television screen and occupies the full vertical dimension and three-fourths of the horizontal dimension. The right quarter of the television screen is used for the display of the scene capture unit identity code and the date and time when the scene capture occurred.

After the scene data is stored in memory, the microprocessor reads the date and time from the clock 81 and converts this data together with the scene capture identity code into a visual display that will occupy the 43-dot×128-double line area on the right side of the television screen. The four-bit pixels constituting the visual display of scene identity code and date and time is written into memory in the same way as the scene data except that the dot count begins with 128 for each line and the dot counter is reset to 128 each time the count reaches 171. The scene identity code and the date and time data is also encoded into a serial binary sequence and appended to the serial binary data that is made available at MT 4 for recording by an audio tape recorder.

After the scene data received from a scene capture unit has been processed and stored in memory, the microprocessor 65 places the memories 67, 69 in the read mode by means of a signal at MT 15. The dot counter 71 and the line counter 73 are initially reset to zero by signals at MT 13 and MT 14. The dot counter is subsequently reset to zero each time it reaches a count of 171. For a period of a few seconds the line counter is subsequently reset to zero when it reaches a count of 128, then it is reset to 128 and subsequently for a period of a few seconds reset to 128 when it reaches a count of 256.

This process wherein the line counter first counts between zero and 127 for a few seconds and then counts between 128 and 255 for a few seconds continues indefinitely. The purpose of this process is to show each of the four scenes stored in memory on the television receiver for a few seconds.

The voltages at MT 6 and MT 10 are maintained high thereby allowing the 3.28-Mhz microprocessor clock signal appearing at MT 9 to pass through NAND gates 77 and 75 and clock the dot counter 71. Every other line of the scene captured by the scene capture unit was transmitted to the scene recovery unit. In order to regenerate the original scene, each line is read out twice thereby generating 256 lines from the 128 lines stored in memory. This process is accomplished by incrementing the line counter 73 with every other carry pulse from the dot counter 71.

The strobe signal at MT 16 alternately strobes the two memories.

The four-bit pixel amplitudes from the memories are converted to analog form by the D/A converter 83. Television sync signals are generated by the microprocessor 65 at MT 11 and added by transistor 85 to the D/A converter output signal. The resulting video signal is buffered by transistor 87 thereby producing a signal at the video output port suitable for the video input of a television receiver 88 or alternatively, for the video input of a TV modulator which translates the signal to RF so that it can be received at the antenna or cable input to a TV receiver or video cassette recorder.

The control device 89 is an arrangement of push buttons and a display that enable a user to enter commands into the microprocessor 65 and monitor status for the purpose of setting the clock 81, controlling the operation of the audio tape recorder, and setting the dwell time of scenes displayed on a television screen.

The preferred embodiment provides the resolution associated with a 128×128 pixel display and a four-bit gray scale. Higher resolutions and gray scales with finer gradations may be desirable for certain applications even though longer time periods would be required for transmitting the data from the scene capture unit to the scene recovery unit. Such variations in the technical parameters of the system are intended to be within the scope of the invention.

An alternative embodiment of the invention is to utilize an appropriately programmed personal computer system in conjunction with the receiver 61, the antenna 63, the transmitter 79, and the antenna 80 as the scene recovery unit. With this embodiment intruders could be viewed on the computer system monitor thereby eliminating the need for a television receiver.

What is claimed is:

1. A scene capture apparatus comprising:
   a means for detecting a change in a scene, a scene being a visual perception of objects contained in a predetermined solid angle;
   a television camera for converting the scene in which a change is detected into an analog electrical signal from which a replica of a single image of the original scene can be obtained;
   a means for reducing the bandwidth of the analog electrical signal; and
   a means for converting a portion of the reduced bandwidth analog electrical signal into a sequence of digital samples representative of a portion of a single image of the scene viewed by the television camera from which a replica of the reduced bandwidth analog electrical signal can be obtained, the remaining portions of the reduced bandwidth analog electrical signal being discarded.

2. A scene capture apparatus comprising:
   a means for detecting a change in a scene, a scene being a visual perception of objects contained in a predetermined solid angle;
   a means for converting the scene in which a change is detected into an analog electrical signal from which a replica of a single image of the original scene can be obtained; and
   a means for converting a portion of the analog electrical signal into a sequence of digital samples representative of a portion of a single image of the scene from which a replica of the electrical signal can be obtained, the remaining portions of the analog electrical signal being discarded; and
   a means for saving power, said power saving means supplying power to the scene converting means only from the time that the change detecting means detects a change in a scene until the sequence of digital samples representative of a portion of a single image of the scene has been obtained.

3. A scene capture apparatus comprising:

a means for detecting a first event, a first event being a change in a scene, a scene being a visual perception of objects contained in a predetermined solid angle;

a means for converting the scene into an electrical signal from which a replica of the original scene can be obtained when a first event occurs; and a means for identifying a first event that occurs within a predetermined time interval after the occurrence of a second event, the operation of the scene converting means being conditioned on the non-occurrence of the first event within the predetermined time interval after the occurrence of the second event.

4. A scene recovery apparatus which receives at a determinable time a sequence of digital samples that represent a scene, a scene being a visual perception of objects contained in a predetermined solid angle, the apparatus comprising:

a means for determining the time at which the sequence of digital samples was received;

a means for augmenting the received digital samples with a plurality of augmenting digital samples representing augmenting data whereby the resulting sequence of digital samples can be converted to an electrical signal which, when introduced into a television receiver, causes the scene to be displayed on one portion of the television screen and the augmenting data to be displayed on another portion, the augmenting data including the time at which the sequence of digital samples was received.

5. The scene recovery apparatus of claim 4 further comprising:

a means for generating from the augmented sequence of digital samples an electrical signal which, when introduced into a television receiver, causes the scene to be displayed on one portion of the television screen and the augmenting data to be displayed on another portion.

6. A security apparatus comprising:

a means for capturing a single image of a scene when a change in the scene occurs, a scene being a visual perception of objects contained in a predetermined solid angle, the captured single image being represented by a sequence of integers;

a memory for storing the sequence of integers representing the captured scene;

a means for communicating the sequence of integers stored in memory to a remote location in a predetermined communication channel.

7. The security apparatus of claim 6 further comprising:

a means for controlling the errors occurring as a result of communicating data to the remote location.

8. The security apparatus of claim 6 wherein the scene capturing means comprises:

a television camera for converting the scene in which a change is detected into an analog electrical signal;

a means for reducing the bandwidth of the output signal from the television camera.

9. The security apparatus of claim 6 wherein the scene capturing means comprises:

a television camera for converting the scene in which a change is detected into an analog electrical signal;

a means for converting a portion of the analog electrical signal into a sequence of integers representative of a portion of a single image of the scene viewed by the television camera, the sequence of integers representative of the single image being stored in the memory, the remaining portions of the analog electrical signal not being used.

10. The security apparatus of claim 6 further comprising:

a means for delaying the transmission of the sequence of integers being communicated to the remote location for a predetermined period of time.

11. The security apparatus of claim 6 further comprising:

a means for communicating data from the remote location to the scene capturing means.

12. The security apparatus of claim 11 further comprising:

a means for recognizing interfering signals in the communication channel.

13. The security apparatus of claim 11 wherein the means for communicating data comprises a transmitter and a receiver at the location of the scene capturing means, the application of power to the transmitter causing the interruption of power to the receiver.

14. A security apparatus comprising:

a means for capturing one and only one image of a scene when a change in the scene occurs, a scene being a visual perception of objects contained in a predetermined solid angle, the captured one and only one image of a scene being represented by a sequence of integers;

a means for communicating the sequence of integers to a remote location in a predetermined communication channel;

a means for generating from the sequence of integers communicated by the scene capturing means and the time at which the sequence was received an electrical signal which, when introduced into a television receiver, causes the scene to be displayed on one portion of the television screen and the time of receipt of the digital samples to be displayed on another portion.

15. The security apparatus of claim 14 wherein the scene capturing means further comprises:

a means for saving power, said power saving means supplying power to the scene capturing means only from the time that a change in a scene occurs until the sequence of integers that represents one and only one image of a scene has been obtained.

16. The security apparatus of claim 14 wherein the scene capturing means comprises:

a means for detecting a first event, a first event being a change in a scene;

a means for converting the scene into an electrical signal from which a replica of the original scene can be obtained when a first event occurs; and a means for identifying a first event that occurs within a predetermined time interval either before or after the occurrence of a second event, the continued operation of the security apparatus being conditioned on the non-occurrence of the first event within the predetermined time interval either before or after the occurrence of the second event.

17. The security apparatus of claim 14 wherein the generating means comprises:

a means for determining the time at which the sequence of digital samples was received;

a means for augmenting the received digital samples with other digital samples whereby the resulting sequence of digital samples can be converted to an electrical signal which, when introduced into a television receiver, causes the scene to be displayed on one portion of the television screen and the time of receipt of the digital samples to be displayed on another portion.

18. The security apparatus of claim 17 wherein the generating means further comprises:
a means for generating from the augmented sequence of digital samples an electrical signal which, when introduced into a television receiver, causes the scene to be displayed on one portion of the television screen and the time of receipt of the digital samples to be displayed on another portion.

19. The security apparatus of claim 14 further comprising:
a means for controlling the errors occurring as a result of communicating data to the generating means.

20. The security apparatus of claim 19 wherein the error control means is a means for detecting the presence of errors in the data communicated to the generating means.

21. The security apparatus of claim 19 wherein the error control means is a means for detecting and correcting errors in the data communicated to the generating means.

22. The security apparatus of claim 14 further comprising:
a communication channel for communicating data from the generating means to the scene capturing means.

23. The security apparatus of claim 22 further comprising:
a means for recognizing interfering signals in the communication channel.

24. The security apparatus of claim 22 wherein the means for communicating data comprises a transmitter and a receiver at the location of the scene capturing means, the application of power to the transmitter causing the interruption of power to the receiver.

25. A process for capturing a scene comprising the steps:
detecting a change in a scene, a scene being a visual perception of objects contained in a predetermined solid angle;
converting the scene in which a change is detected into an analog electrical signal from which a replica of a single image of the original scene can be obtained;
reducing the bandwidth of the analog electrical signal; and
converting a portion of the reduced bandwidth analog electrical signal into a sequence of digital samples representative of a portion of a single image of the scene from which a replica of the reduced bandwidth electrical signal can be obtained, the remaining portions of the reduced bandwidth analog electrical signal being discarded.

26. A process for capturing a scene comprising the steps:
detecting a first event, a first event being a change in a scene, a scene being a visual perception of objects contained in a predetermined solid angle;
determining whether the first event occurred within a predetermined time interval after the occurrence of a second event;
converting the scene into an electrical signal from which a replica of the original scene can be obtained when a first event occurs provided the first event did not occur within a predetermined time interval after the second event.

27. A process for recovering a scene from a sequence of digital samples received at a determinable time, a scene being a visual perception of objects contained in a predetermined solid angle, the process comprising the steps:
determining the time at which the sequence of digital samples was received;
augmenting the received digital samples with a plurality of augmenting digital samples representing augmenting data whereby the resulting sequence of digital samples can be converted to an electrical signal which, when introduced into a television receiver, causes the scene to be displayed on one portion of the television screen and the augmenting data to be displayed on another portion, the augmenting data including the time at which the sequence of digital samples was received.

28. The process of claim 27 further comprising the step:
generating from the augmented sequence of digital samples an electrical signal which, when introduced into a television receiver, causes the scene to be displayed on one portion of the television screen and the augmenting data to be displayed on another portion.

29. A process for providing security comprising the steps:
(a) capturing one and only one image of a scene when a change in the scene occurs, a scene being a visual perception of objects contained in a predetermined solid angle, the captured one and only one image of a scene being represented by a sequence of integers;
(b) communicating the sequence of integers to a remote location in a predetermined communication channel;
(c) generating from the sequence of integers communicated by the scene capturing means to the remote location and the time at which the sequence was received an electrical signal which, when introduced into a television receiver, causes the scene to be displayed on one portion of the television screen and the time of receipt of the digital samples to be displayed on another portion.

30. The process of claim 29 wherein step (a) comprises the steps:
detecting a first event, a first event being a change in a scene;
determining whether the first event occurred within a predetermined time interval either before or after the occurrence of a second event;
converting the scene into an electrical signal from which a replica of the original scene can be obtained when a first event occurs provided the first event did not occur within a predetermined time interval after the second event;
aborting steps (b) and (c) provided the change did occur within a predetermined time interval either before or after the occurrence of the second event.

31. The process of claim 29 wherein step (c) comprises the steps:
determining the time at which the sequence of digital samples was received;
augmenting the received digital samples with other digital samples whereby the resulting sequence of digital samples can be converted to an electrical signal which, when introduced into a television receiver, causes the scene to be displayed on one portion of the television screen and the time of receipt of the digital samples to be displayed on another portion.

32. The process of claim 31 wherein step (c) further comprises the step:
generating from the augmented sequence of digital samples an electrical signal which, when introduced into a television receiver, causes the scene to be displayed on one portion of the television screen and the time of receipt of the digital samples to be displayed on another portion.

33. The process of claim 29 wherein step (b) further comprises the step:

controlling the errors occurring as a result of communicating data to the remote location.

34. The process of claim 33 wherein the controlling errors step comprises:

determining if errors are present in the data communicated to the remote location;

requesting that the data be retransmitted if errors are present.

35. The process of claim 33 wherein the controlling errors step comprises:

controlling errors by the use of error correcting codes;

correcting errors in the data received at the remote location.

36. A scene capture apparatus comprising:

a means for detecting a change in a scene, a scene being a visual perception of objects contained in a predetermined solid angle;

a means for converting the scene in which a change is detected into an analog electrical signal from which a replica of the original scene can be obtained; and a means for converting a portion of the analog electrical signal into a sequence of integers representative of a portion of a single image of the scene, the remaining portions of the analog electrical signal not being used.

37. A process for capturing a scene comprising the steps:

detecting a change in a scene, a scene being a visual perception of objects contained in a predetermined solid angle;

converting the scene in which a change is detected into an analog electrical signal from which a replica of the original scene can be obtained; and converting a portion of the analog electrical signal into a sequence of digital samples representative of a portion of a single image of the scene, the remaining portions of the analog electrical signal not being used.

* * * * *